United States Patent Office 3,738,885
Patented June 12, 1973

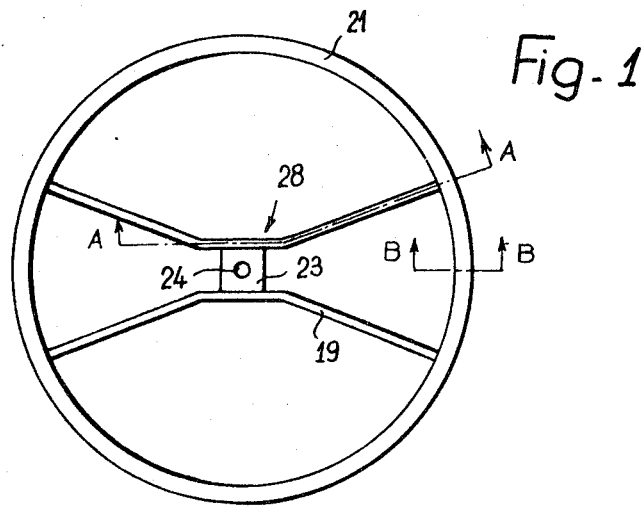
Fig. 1
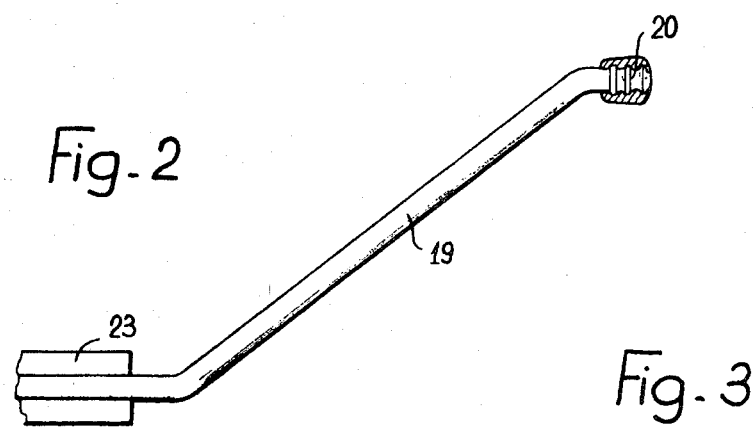
Fig. 2
Fig. 3
Fig. 4

3,738,885
METHODS OF MANUFACTURING STEERING WHEELS
Alexandre Lecomte, Billancourt, France, assignor to Regie Nationale des Usines Renault, Billancourt (Hauts de Seine), and Automobiles Peugot, Paris, France
Filed May 13, 1970, Ser. No. 36,850
Int. Cl. B65h 81/06
U.S. Cl. 156—172                     1 Claim

ABSTRACT OF THE DISCLOSURE

A method of manufacturing a steering wheel for a motor vehicle which comprises a rim connected through arms to an axial member, said rim being obtained either by winding a preliminary pattern or by direct winding of textile glass material selected from the group consisting of monofilaments, yarns or roving, embedded in a plastic resin adapted to set, by using a rotary circular mould formed with a peripheral recess adapted to wind said textile glass, said mould consisting of a pulley formed by a pair of registering and detachable flanges, said method being characterized in that there are provided at the outer ends of said arms a plurality of rim-anchoring projections, and that said arms are so disposed in said mould that their ends project therefrom inside said recess adapted to receive the textile glass winding, the winding operation proper being eventually performed whereby said projections are embedded therein.

---

This invention relates to the manufacture of steering wheels.

A method of manufacturing steering wheels is already known which is applicable more particularly to steering wheels for motor vehicles in that the products obtained combine a high degree of safety with useful properties such as light weight and resiliency, so that they can damp out a certain amount of energy in case of shock or crash, while having a lower inertia during the steering movements.

According to a specific form of embodiment of this known method, the rim of the steering wheel is obtained by winding a preliminary pattern, or by winding directly textile glass material in the form of a monofilament, yarn or roving, which is embedded in a plastic resin adapted to set, on a circular rotary mould formed with a peripheral recess for said winding and consisting of a pulley comprised of a pair of detachable flanges. The part resulting from the direct winding or the part shaped under pressure from the above-mentioned preliminary pattern is set or polymerized in the known fashion either at room temperature or in an oven.

According to an improvement also known in the art, impressions resulting from the moulding operation are formed on the rim for receiving fastening members for the "spokes" or supporting arms consisting advantageously of a double arm. The steering wheel manufacturing process comprises under these conditions a first step (winding the textile material) and a second step (fastening the arms or "spokes").

It is the essential object of this invention to provide an improvement whereby the arms and rim can be assembled during the rim shaping operation.

To this end, and according to the method of this invention, the ends of the arms are provided with a plurality of rim anchoring projections, these arms being so disposed in the mould that their ends project into the recess provided for receiving the winding of glass yarn or fibres coated with plastic resin, and the winding operation being performed while embedding said anchoring projections in the wound monofilament, yarn or roving.

Thus, the arms are definitely and non-detachably anchored in the rim during the rim-forming operation. As a consequence, the use of additional fastening members, an assembling operation and the necessary labor are completely eliminated.

The invention will now be described more in detail with reference to the attached drawing illustrating diagrammatically a typical form of embodiment of the method and products characterizing this invention. In the drawing:

FIG. 1 is a plan view of a steering wheel obtained by means of the manufacturing method of this invention;

FIG. 2 is a section taken along the line A—A of FIG. 1;

FIGS. 3 and 4 are radial sections showing on a larger scale a solid portion of the rim (section B—B of FIG. 1) and the anchoring portion (section A, FIG. 1), respectively;

Figure 5:
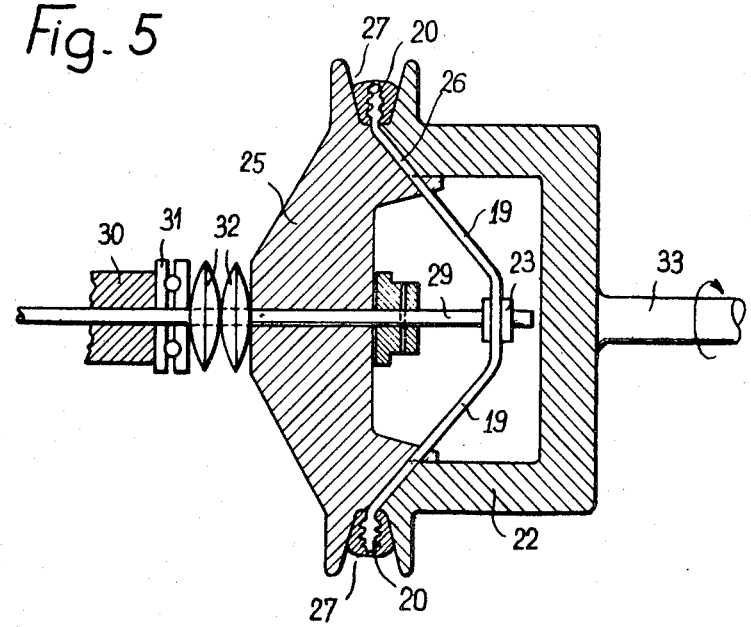
FIG. 5 is a diagrammatic axial sectional view showing the moulding apparatus during the rim moulding operation.

According to this invention, the ends of the arms or spokes of the steering wheel are anchored in the rim during the moulding of the latter, by providing on the outer ends of arms 19 a plurality of ring-shaped projections 20 for example in the form of circular beads and disposing these projections inside a mould cavity adapted to form the rim 21 in a manner to be explained presently.

To this end, the moulding drum advantageously consisting of a pair of flanges 22, 25 comprises along the junction planes of these flanges a plurality of passages 26 adapted to receive the arms 19 so that the projections 20 emerge into the annular peripheral recess 27 formed (in the closed-mould position) in the external periphery of said flanges, along their junction plane, said recess being adapted to receive the winding of resin-coated or impregnated fibrous material.

As clearly apparent from the figures, the arms 19 constitute a unitary structure 28 comprising a central element 23 with an axial hole 24.

Figure 6:
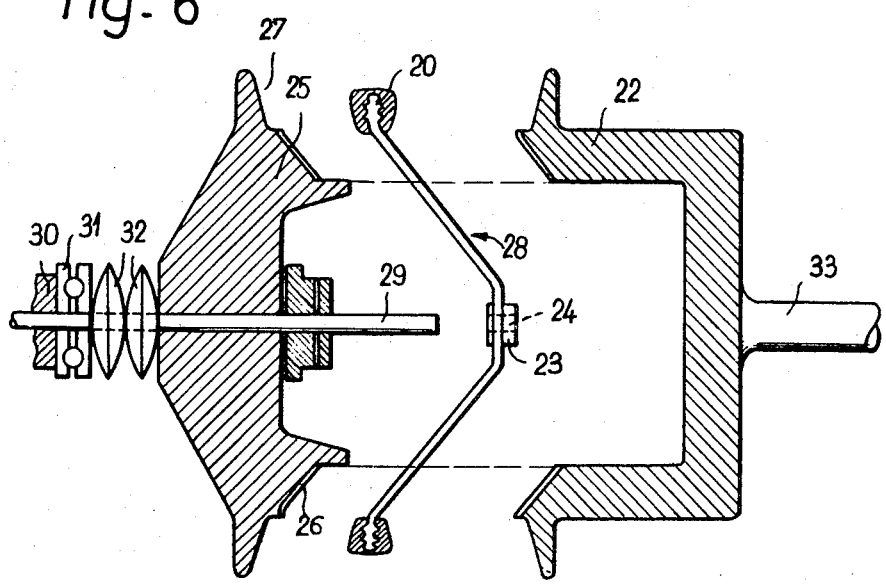
FIG. 6 is a view similar to FIG. 5 but showing the same moulding apparatus after the flanges of the moulding drum have been moved away from each other for the removal of the completed steering wheel therefrom.

After inserting said structure 28 between the flanges 22 and 25 and slipping the element 23 on an axial supporting shaft or rod 29 extending through the flange 25 (FIGS. 5 and 6), the latter is pressed against the other flange 22 by means of a hollow spindle 30 mounted with clearance on said shaft or rod 29 and exerting its pressure through the medium of a thrust ball-bearing 31 and compression springs 32, consisting in this example of dished washers or like means. The pressure members adapted to move the hollow spindle 30 and the flange 25 together with the sliding support of said spindle are not shown as they constitute conventional elements in the art.

On the other hand, the flange 22 is mounted on a stub shaft 33 rotatably supported and driven by means of known elements (not shown).

Supported on one side by the hollow spindle 30 and on the other side by the rotary stub shaft 33, and axially clamped by said spindle, the assembly is rotatably driven by the stub shaft 33 so that the resin-impregnated or coated glass fibres can be wound within the peripheral recess 27. Of course, this recess may be coated beforehand with a separating product with a view to facilitate the subequent stripping of the rim from the moulding recess. The textile glass material in the form of a monofilament, yarn or roving may consist of a pre-impregnated material, or delivered, according to the so-called "wet" filament winding process, from an installation of the type illustrated in FIG. 7.

Figure 7:
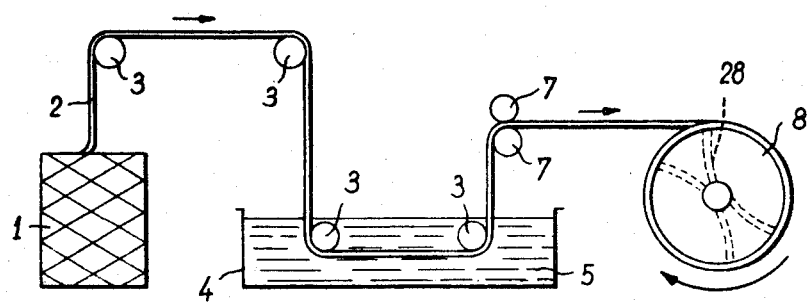
FIG. 7 is a diagrammatic view showing the series of steps to which the glass monofilament, yarn or roving is subjected before being wound to constitute the rim.

As clearly apparent from FIG. 7, a roving 2 of textile glass is taken from a spool 1 and conveyed by rolls 3 towards a vessel 4 containing a suitable impregnation plastic resin 5. As it emerges from the vessel 4 the excess resin is removed from the roving 2 by the action of rolls 7 and the roving is wound on a pulley 8 consisting a pair of registering flanges forming together a peripheral recesses 27 in which the rim 21 of the steering wheel is adapted to be formed. After cutting the roving and drying the rim 21 the two flanges of the pulley 8 are then moved away from each other to permit the stripping thereof. With this arrangement it is possible to obtain either a preliminary shape or pattern, or a finished rim if resins adapted to set without the application of pressure are used. The resin setting time may be reduced by passing the pulley 8 through an oven, the flanges constituting in this case the two halves of the final mould.

Finally, the steering wheel thus obtained may be coated for example by foaming a suitable plastic material up to a predetermined thickness. Upholstery material may advantageously be provided for lining the arms 28 and the hub consisting of the central element 23 or secured to this element.

I claim:
1. A method of forming a steering wheel, comprising:
placing a wheel support means on one flange of a two-piece steering wheel mold,
said wheel support means comprising a central hub and a plurality of arms connected to said hub and extending substantially radially from said hub into the plane of the wheel rim to be supported by said support means.
and said two-piece steering wheel mold comprising a pair of separable, registering rotary flanges which form a pulley-like annular groove therebetween on their peripheries when registered together, said flanges having recesses on their facing portions, said recesses for receiving the arms of wheel support means, and said mold rotatably mounted for rotation about the axis of the annular groove,
said arms terminating in rim-anchoring projection, by placing the arms in the recesses on the flange and placing the central hub over an axial supporting shaft which extends along the axis of the groove formed by the mold flanges;
closing the pair of rotary flanges and biasing the two flanges together by biasing means for forcing said flanges together along the direction of said axis thereby locking the wheel support means between said flanges with the rim-achoring projections of the arms in the annular groove;
rotating the mold about the axis of the annular groove; and winding a plastic impregnated glass fiber strand in the annular groove of said mold thereby embedding the rim-anchoring projections of the support arms and building-up the steering wheel rim from the wound, impregnated strand;
passing the wound mold through an oven for setting the plastic impregnant; and
separating the two mold flanges and stripping the molded wheel from the mold.

References Cited
UNITED STATES PATENTS

| | | | |
|---|---|---|---|
| 1,212,169 | 1/1917 | Bateholts | 156—173 X |
| 1,680,646 | 8/1928 | Smith | 74—552 |
| 2,185,568 | 1/1940 | Batner | 74—552 |
| 1,740,750 | 12/1929 | Smith | 74—552 |
| 692,602 | 2/1902 | Bicalky | 74—552 X |

CARL D. QUARFORTH, Primary Examiner

E. E. LEHMANN, Assistant Examiner

U.S. Cl. X.R.

203—14, 81, 98, 99, DIG. 10; 260—497 A, 499

UNITED STATES PATENT OFFICE
CERTIFICATE OF CORRECTION

Patent No. 3,738,885　　　　　　　　Dated June 12, 1973

Inventor(s) Alexandre LECOMTE

It is certified that error appears in the above-identified patent and that said Letters Patent are hereby corrected as shown below:

In the identification of the assignees, the second assignee should read -- Automobiles Peugeot -- in place of Automobiles Peugot.

Signed and sealed this 2nd day of July 1974.

(SEAL)
Attest:

EDWARD M. FLETCHER, JR.
Attesting Officer

C. MARSHALL DANN
Commissioner of Patents